United States Patent
Colgrove et al.

(10) Patent No.: US 11,811,619 B2
(45) Date of Patent: *Nov. 7, 2023

(54) EMULATING A LOCAL INTERFACE TO A REMOTELY MANAGED STORAGE SYSTEM

(71) Applicant: PURE STORAGE, INC., Mountain View, CA (US)

(72) Inventors: John Colgrove, Los Altos, CA (US); Benjamin Borowiec, San Jose, CA (US); Joseph S. Hasbani, Palo Alto, CA (US); Emanuel G. Noik, Palo Alto, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,959

(22) Filed: Sep. 9, 2022

(65) Prior Publication Data

US 2023/0006894 A1 Jan. 5, 2023

Related U.S. Application Data

(63) Continuation of application No. 17/244,698, filed on Apr. 29, 2021, now Pat. No. 11,444,849, which is a (Continued)

(51) Int. Cl.
*H04L 41/22* (2022.01)
*G06F 11/34* (2006.01)
(Continued)

(52) U.S. Cl.
CPC ........... *H04L 41/22* (2013.01); *G06F 3/0484* (2013.01); *G06F 11/3034* (2013.01);
(Continued)

(58) Field of Classification Search
CPC ...................................................... H04L 41/22
See application file for complete search history.

(56) References Cited

U.S. PATENT DOCUMENTS

| 5,208,813 | A | 5/1993 | Stallmo |
| 5,403,639 | A | 4/1995 | Belsan et al. |

(Continued)

FOREIGN PATENT DOCUMENTS

| CN | 103370685 A | 10/2013 |
| CN | 103370686 A | 10/2013 |

(Continued)

OTHER PUBLICATIONS

Hwang et al., "RAID-x: A New Distributed Disk Array for I/O-Centric Cluster Computing", Proceedings of The Ninth International Symposium On High-performance Distributed Computing, Aug. 2000, pp. 279-286, The Ninth International Symposium on High-Performance Distributed Computing, IEEE Computer Society, Los Alamitos, CA.

(Continued)

*Primary Examiner* — Roland J Casillas

(57) ABSTRACT

Systems, methods, and computer readable storage mediums for emulating a local interface to a remotely managed storage system, including: receiving a request for remote access a storage system, wherein access is provided using a user interface ('UI'); identifying, for a user profile, a version of the UI that is utilized when locally accessing the storage system; and presenting, a remote UI for the storage system, wherein a version of the remote UI matches the version of the UI that is utilized when the user locally accesses the storage system, wherein the remote UI provides read-only access to the storage system.

17 Claims, 9 Drawing Sheets

Related U.S. Application Data continuation of application No. 16/199,889, filed on Nov. 26, 2018, now Pat. No. 10,999,157, which is a continuation of application No. 14/504,945, filed on Oct. 2, 2014, now Pat. No. 10,164,841.

(51) Int. Cl.
*G06F 11/30* (2006.01)
*G06F 3/0484* (2022.01)
*H04L 67/1097* (2022.01)
*G06F 11/32* (2006.01)

(52) U.S. Cl.
CPC ...... *G06F 11/3476* (2013.01); *H04L 67/1097* (2013.01); *G06F 11/324* (2013.01); *G06F 11/3409* (2013.01)

(56) References Cited

U.S. PATENT DOCUMENTS

| | | | |
|---|---|---|---|
| 5,940,838 | A | 8/1999 | Schmuck et al. |
| 6,263,350 | B1 | 7/2001 | Wollrath et al. |
| 6,412,045 | B1 | 6/2002 | DeKoning et al. |
| 6,718,448 | B1 | 4/2004 | Ofer |
| 6,757,769 | B1 | 6/2004 | Ofer |
| 6,799,283 | B1 | 9/2004 | Tamai et al. |
| 6,834,298 | B1 | 12/2004 | Singer et al. |
| 6,850,938 | B1 | 2/2005 | Sadjadi |
| 6,915,434 | B1 | 7/2005 | Kuroda et al. |
| 6,973,549 | B1 | 12/2005 | Testardi |
| 7,028,216 | B2 | 4/2006 | Aizawa et al. |
| 7,028,218 | B2 | 4/2006 | Schwarm et al. |
| 7,039,827 | B2 | 5/2006 | Meyer et al. |
| 7,216,164 | B1 | 5/2007 | Whitmore et al. |
| 7,292,969 | B1 * | 11/2007 | Aharoni ............... G06F 11/3419 703/22 |
| 7,783,682 | B1 | 8/2010 | Patterson |
| 7,873,619 | B1 | 1/2011 | Faibish et al. |
| 7,913,300 | B1 | 3/2011 | Flank et al. |
| 7,933,936 | B2 | 4/2011 | Aggarwal et al. |
| 7,975,115 | B2 | 7/2011 | Wayda et al. |
| 7,979,613 | B2 | 7/2011 | Zohar et al. |
| 8,086,652 | B1 | 12/2011 | Bisson et al. |
| 8,117,464 | B1 | 2/2012 | Kogelnik |
| 8,200,887 | B2 | 6/2012 | Bennett |
| 8,205,065 | B2 | 6/2012 | Matze |
| 8,352,540 | B2 | 1/2013 | Anglin et al. |
| 8,504,797 | B2 | 8/2013 | Mimatsu |
| 8,527,544 | B1 | 9/2013 | Colgrove et al. |
| 8,560,747 | B1 | 10/2013 | Tan et al. |
| 8,621,241 | B1 | 12/2013 | Stephenson |
| 8,700,875 | B1 | 4/2014 | Barron et al. |
| 8,751,463 | B1 | 6/2014 | Chamness |
| 8,806,160 | B2 | 8/2014 | Colgrove et al. |
| 8,822,155 | B2 | 9/2014 | Sukumar et al. |
| 8,874,850 | B1 | 10/2014 | Goodson et al. |
| 8,959,305 | B1 | 2/2015 | LeCrone et al. |
| 9,081,713 | B1 | 7/2015 | Bennett |
| 9,189,334 | B2 | 11/2015 | Bennett |
| 9,280,678 | B2 | 3/2016 | Redberg |
| 9,311,182 | B2 | 4/2016 | Bennett |
| 9,395,922 | B2 | 7/2016 | Nishikido et al. |
| 9,423,967 | B2 | 8/2016 | Colgrove et al. |
| 9,436,396 | B2 | 9/2016 | Colgrove et al. |
| 9,436,720 | B2 | 9/2016 | Colgrove et al. |
| 9,454,476 | B2 | 9/2016 | Colgrove et al. |
| 9,454,477 | B2 | 9/2016 | Colgrove et al. |
| 9,513,820 | B1 | 12/2016 | Shalev |
| 9,516,016 | B2 | 12/2016 | Colgrove et al. |
| 9,552,248 | B2 | 1/2017 | Miller et al. |
| 9,632,870 | B2 | 4/2017 | Bennett |
| 10,164,841 | B2 | 12/2018 | Colgrove et al. |
| 10,324,639 | B2 | 6/2019 | Seo |
| 10,567,406 | B2 | 2/2020 | Astigarraga et al. |
| 10,846,137 | B2 | 11/2020 | Vallala et al. |
| 10,877,683 | B2 | 12/2020 | Wu et al. |
| 10,999,157 | B1 | 5/2021 | Colgrove et al. |
| 11,076,509 | B2 | 7/2021 | Alissa et al. |
| 11,106,810 | B2 | 8/2021 | Natanzon et al. |
| 11,194,707 | B2 | 12/2021 | Stalzer |
| 11,444,849 | B2 | 9/2022 | Colgrove et al. |
| 2002/0038436 | A1 | 3/2002 | Suzuki |
| 2002/0087544 | A1 | 7/2002 | Selkirk et al. |
| 2002/0178335 | A1 | 11/2002 | Selkirk et al. |
| 2003/0093619 | A1 | 5/2003 | Sugino et al. |
| 2003/0140209 | A1 | 7/2003 | Testardi |
| 2004/0049572 | A1 | 3/2004 | Yamamoto et al. |
| 2005/0066095 | A1 | 3/2005 | Mullick et al. |
| 2005/0216535 | A1 | 9/2005 | Saika et al. |
| 2005/0223154 | A1 | 10/2005 | Uemura |
| 2006/0074940 | A1 | 4/2006 | Craft et al. |
| 2006/0136365 | A1 | 6/2006 | Kedem et al. |
| 2006/0155946 | A1 | 7/2006 | Ji |
| 2007/0067585 | A1 | 3/2007 | Ueda et al. |
| 2007/0162954 | A1 | 7/2007 | Pela |
| 2007/0171562 | A1 | 7/2007 | Maejima et al. |
| 2007/0174673 | A1 | 7/2007 | Kawaguchi et al. |
| 2007/0220313 | A1 | 9/2007 | Katsuragi et al. |
| 2007/0245090 | A1 | 10/2007 | King et al. |
| 2007/0266179 | A1 | 11/2007 | Chavan et al. |
| 2008/0059699 | A1 | 3/2008 | Kubo et al. |
| 2008/0065852 | A1 | 3/2008 | Moore et al. |
| 2008/0134174 | A1 | 6/2008 | Sheu et al. |
| 2008/0155191 | A1 | 6/2008 | Anderson et al. |
| 2008/0178040 | A1 | 7/2008 | Kobayashi |
| 2008/0209096 | A1 | 8/2008 | Lin et al. |
| 2008/0244205 | A1 | 10/2008 | Amano et al. |
| 2008/0256141 | A1 | 10/2008 | Wayda et al. |
| 2008/0275928 | A1 | 11/2008 | Shuster |
| 2008/0285083 | A1 | 11/2008 | Aonuma |
| 2008/0307270 | A1 | 12/2008 | Li |
| 2009/0006587 | A1 | 1/2009 | Richter |
| 2009/0037662 | A1 | 2/2009 | La Frese et al. |
| 2009/0204858 | A1 | 8/2009 | Kawaba |
| 2009/0228648 | A1 | 9/2009 | Wack |
| 2009/0300084 | A1 | 12/2009 | Whitehouse |
| 2010/0057673 | A1 | 3/2010 | Savov |
| 2010/0058026 | A1 | 3/2010 | Heil et al. |
| 2010/0067706 | A1 | 3/2010 | Anan et al. |
| 2010/0077205 | A1 | 3/2010 | Ekstrom et al. |
| 2010/0082879 | A1 | 4/2010 | McKean et al. |
| 2010/0106905 | A1 | 4/2010 | Kurashige et al. |
| 2010/0153620 | A1 | 6/2010 | McKean et al. |
| 2010/0153641 | A1 | 6/2010 | Jagadish et al. |
| 2010/0191897 | A1 | 7/2010 | Zhang et al. |
| 2010/0250802 | A1 | 9/2010 | Waugh et al. |
| 2010/0250882 | A1 | 9/2010 | Hutchison et al. |
| 2010/0281225 | A1 | 11/2010 | Chen et al. |
| 2010/0287327 | A1 | 11/2010 | Li et al. |
| 2010/0306500 | A1 | 12/2010 | Mimatsu |
| 2011/0035540 | A1 | 2/2011 | Fitzgerald et al. |
| 2011/0072300 | A1 | 3/2011 | Rousseau |
| 2011/0145598 | A1 | 6/2011 | Smith et al. |
| 2011/0161559 | A1 | 6/2011 | Yurzola et al. |
| 2011/0167221 | A1 | 7/2011 | Pangal et al. |
| 2011/0238634 | A1 | 9/2011 | Kobara |
| 2012/0023375 | A1 | 1/2012 | Dutta et al. |
| 2012/0036309 | A1 | 2/2012 | Dillow et al. |
| 2012/0117029 | A1 | 5/2012 | Gold |
| 2012/0198175 | A1 | 8/2012 | Atkisson |
| 2012/0330954 | A1 | 12/2012 | Sivasubramanian et al. |
| 2013/0042052 | A1 | 2/2013 | Colgrove et al. |
| 2013/0046995 | A1 | 2/2013 | Movshovitz |
| 2013/0047029 | A1 | 2/2013 | Ikeuchi et al. |
| 2013/0091102 | A1 | 4/2013 | Nayak |
| 2013/0179461 | A1 * | 7/2013 | Sharma ............... G06F 11/3055 707/769 |
| 2013/0205110 | A1 | 8/2013 | Kettner |
| 2013/0227236 | A1 | 8/2013 | Flynn et al. |
| 2013/0275391 | A1 | 10/2013 | Batwara et al. |
| 2013/0275656 | A1 | 10/2013 | Talagala et al. |
| 2013/0283058 | A1 | 10/2013 | Fiske et al. |
| 2013/0290648 | A1 | 10/2013 | Shao et al. |
| 2013/0318314 | A1 | 11/2013 | Markus et al. |

(56) References Cited

U.S. PATENT DOCUMENTS

| | | |
|---|---|---|
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0220561 A1 | 8/2014 | Sukumar et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0019620 A1 | 1/2015 | Gidron et al. |
| 2015/0154418 A1 | 6/2015 | Redberg |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0026397 A1 | 1/2016 | Nishikido et al. |
| 2016/0098191 A1 | 4/2016 | Golden et al. |
| 2016/0098199 A1 | 4/2016 | Golden et al. |
| 2016/0099844 A1 | 4/2016 | Colgrove et al. |
| 2016/0182542 A1 | 6/2016 | Staniford |
| 2016/0248631 A1 | 8/2016 | Duchesneau |
| 2017/0262202 A1 | 9/2017 | Seo |
| 2018/0054454 A1 | 2/2018 | Astigarraga et al. |
| 2018/0081562 A1 | 3/2018 | Vasudevan |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0250248 A1 | 8/2021 | Colgrove et al. |
| 2021/0360833 A1 | 11/2021 | Alissa et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007087036 A | 4/2007 |
| JP | 2007094472 A | 4/2007 |
| JP | 2008250667 A | 10/2008 |
| JP | 2010211681 A | 9/2010 |
| WO | 1995002349 A1 | 1/1995 |
| WO | 1999013403 A1 | 3/1999 |
| WO | 2008102347 A1 | 8/2008 |
| WO | 2010071655 A1 | 6/2010 |
| WO | 2016053887 A1 | 4/2016 |

OTHER PUBLICATIONS

International Search Report and Written Opinion, PCT/US2015/052689, dated Jan. 25, 2016, 11 pages.

Microsoft Corporation, "Fundamentals of Garbage Collection", Retrieved Aug. 30, 2013 via the WayBack Machine, 11 pages.

Microsoft Corporation, "GCSettings.IsServerGC Property", Retrieved Oct. 27, 2013 via the WayBack Machine, 3 pages.

Stalzer, "FlashBlades: System Architecture and Applications", Proceedings of the 2nd Workshop on Architectures and Systems for Big Data, Jun. 2012, pp. 10-14, Association for Computing Machinery, New York, NY.

Storer et al., "Pergamum: Replacing Tape with Energy Efficient, Reliable, Disk-Based Archival Storage", FAST'08: Proceedings of the 6th USENIX Conference on File and Storage Technologies, Article No. 1, Feb. 2008, pp. 1-16, USENIX Association, Berkeley, CA.

* cited by examiner

EMULATING A LOCAL INTERFACE TO A REMOTELY MANAGED STORAGE SYSTEM

CROSS-REFERENCE TO RELATED APPLICATIONS

This is a continuation application for patent entitled to a filing date and claiming the benefit of earlier-filed U.S. Pat. No. 11,444,849, issued Sep. 13, 2022, herein incorporated by reference in its entirety, which is a continuation of U.S. Pat. No. 10,999,157, issued May 4, 2021, which is a continuation of U.S. Pat. No. 10,164,841, issued Dec. 25, 2018.

BACKGROUND

Technical Field

Embodiments described herein relate to storage systems, and more particularly, to techniques for generating a read-only GUI for a storage system via a cloud-based assist service.

Description of the Related Art

As computer memory storage and data bandwidth increase, so does the amount and complexity of data that businesses daily manage. Large-scale distributed storage systems, such as data centers, typically run many business operations. A distributed storage system may be coupled to client computers interconnected by one or more networks. To manage and store ever increasing amounts of data, storage systems tend to grow in size and complexity over time. Due to the expanding nature of data and increasing complexity of storage systems, managing storage environments can be a difficult and complex task.

SUMMARY

Various embodiments of systems and methods for using cloud-assist logic to generate a read-only GUI of the status of a storage system.

In one embodiment, a storage system may comprise one or more storage subsystems (e.g., storage arrays), and the storage system may be coupled to a cloud-assist service. The storage subsystems may be configured to generate log data and phone home the log data on a periodic basis to the cloud-assist service. The cloud-assist service may be configured to save the log data and then accept a login from a customer or administrator to generate a read-only GUI which allows the user to view the status of the storage subsystem as if they were directly connected to the storage subsystem. The read-only GUI allows the user to view the status of the storage subsystem even if the storage subsystem is offline, malfunctioning, or otherwise unavailable.

The first storage subsystem may be configured to generate a local GUI to allow users to view the status of the first storage subsystem when directly connected to the first storage subsystem. In one embodiment, configuration and performance data used to present the GUI locally on the first storage subsystem for a local administrator may be sent to the cloud-assist service. In one embodiment, the cloud-assist service may be configured to create the read-only GUI by simulating the responses for configuration and performance data which the first storage subsystem would normally generate for the local GUI. The cloud-assist service may simulate the responses using the configuration and performance data received as log data from the first storage subsystem.

In one embodiment, if an administrator of the first storage subsystem is off-site, instead of logging in through their organization's firewall to the first storage subsystem, the administrator can login to the cloud-assist service to view the read-only GUI showing the status of the first storage subsystem. The read-only GUI may have the same appearance the administrator is accustomed to seeing when they login to the local GUI of the first storage subsystem. The read-only GUI may also recreate previous points in time if the administrator desires to see a historical view of the status of the first storage subsystem.

These and other embodiments will become apparent upon consideration of the following description and accompanying drawings.

Figure 1:
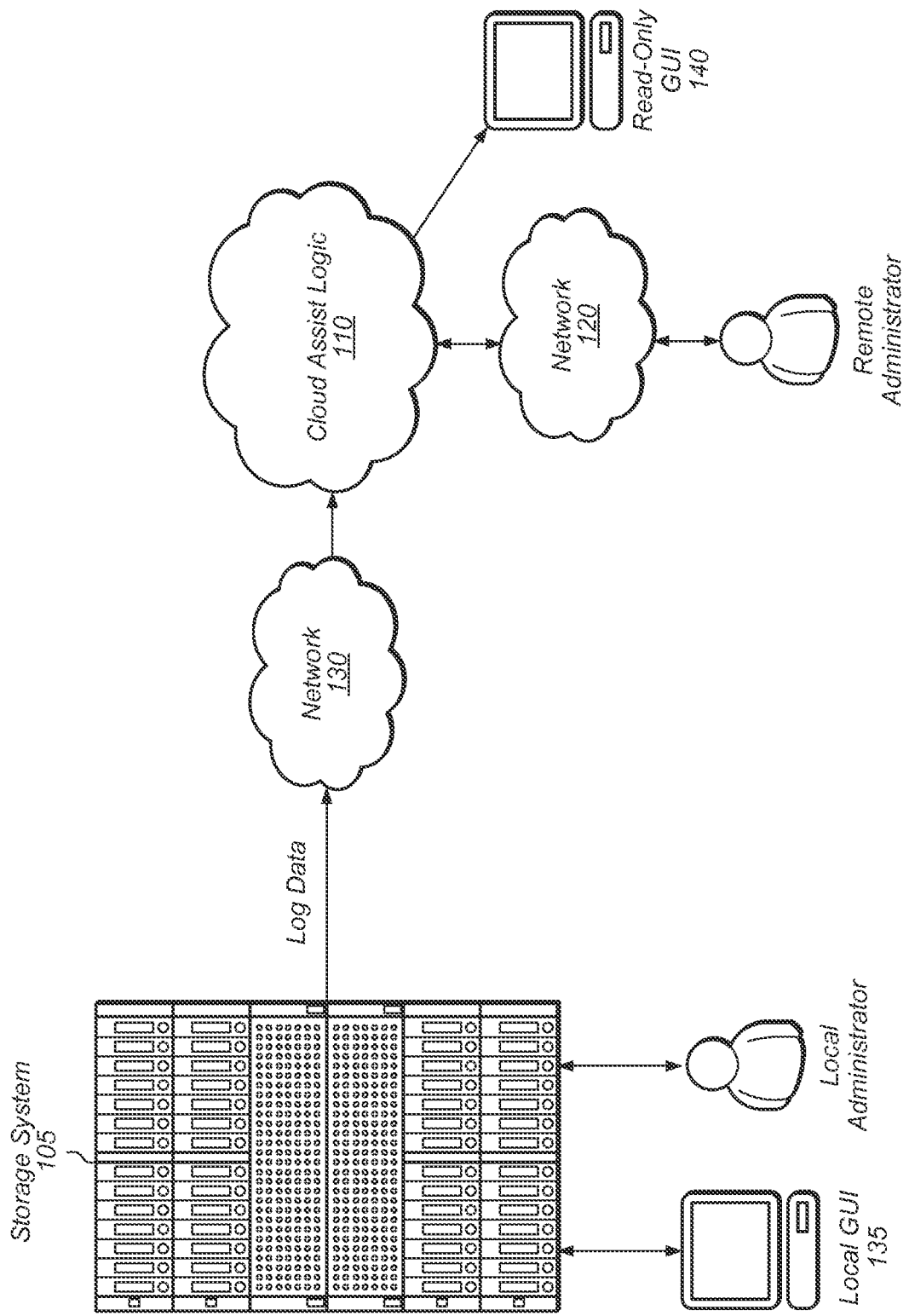
FIG. 1 is a generalized block diagram illustrating one embodiment of a storage system coupled to cloud assist logic.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a first storage subsystem . . . " Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system coupled to cloud assist logic is shown. Storage system 105 may be coupled to cloud assist logic 110 via network 130. Storage system 105 may be configured to generate log data with information associated with the performance and status of storage system 105, and storage system 105 may be configured to convey the log data to cloud assist logic 110 on a regularly scheduled basis. Alternatively, storage system 105 may be configured to convey the log data to cloud assist logic 110 when an local administrator or other local user initiates the transfer of log data. In another embodiment, cloud assist logic 110 may be configured to request the log data from storage system 105.

In various embodiments, storage system 105 may include any number of storage controllers and any number of storage devices. Storage system 105 may be any type of storage system depending on the embodiment. For example, in one embodiment, storage system 105 may be a storage array. The storage array may utilize different types of storage device technology, depending on the embodiment. For example, in one embodiment, the storage array may utilize flash (or solid-state) storage devices and may be an all-flash storage array. In other embodiments, the storage array may utilize other types of storage device technology. It is noted that storage system 105 may also be referred to as a storage subsystem.

In various embodiments, cloud assist logic 110 may include program instructions which when executed by a processor are configured to generate a read-only GUI of the status of storage system 105. Cloud assist logic 110 may be configured to execute on a server, computer, or other computing device to perform the functions described herein. In some embodiments, cloud assist logic 110 may include hardware and/or control logic configured to perform the functions and tasks described herein. For example, cloud assist logic 110 may be implemented using any combination of dedicated hardware (e.g., application specific integrated circuit (ASIC)), configurable hardware (e.g., field programmable gate array (FPGA)), and/or software (e.g., program instructions) executing on one or more processors. It is noted that cloud assist logic 110 may also be referred to as cloud-based logic 110 or cloud assist service 110.

In one embodiment, cloud assist logic 110 may execute within a cloud computing platform provided by a web services provider (e.g., Amazon). The cloud computing platform may provide large amounts of computing assets and storage availability to cloud assist logic 110. In another embodiment, cloud assist logic 110 may execute on a separate system or network external to the local network of storage system 105.

Storage system 105 may be configured to generate a local graphical user interface (GUI) 135 to allow a local administrator or other users to view the status of storage system 105 and to manage the performance of storage system 105. In one embodiment, the log data generated by storage system 105 may be repurposed by cloud assist logic 110 to create read-only GUI 140 to allow a remote administrator or other user who is not able to login directly to storage system 105 to view the status of storage system 105 in the same familiar GUI presented locally on local GUI 135. For example, a user may be travelling or off-site and may not have local access to storage system 105. In some cases, the user may not wish to login through the local network of storage system 105 for a variety of reasons. For example, the user may be on an insecure network or insecure device and may not wish to compromise the security of storage system 105. Therefore, the user may login to cloud assist logic 110 via network 120 to allow the user to view the read-only GUI 140 generated from the log data retrieved from storage system 105.

Figure 2:
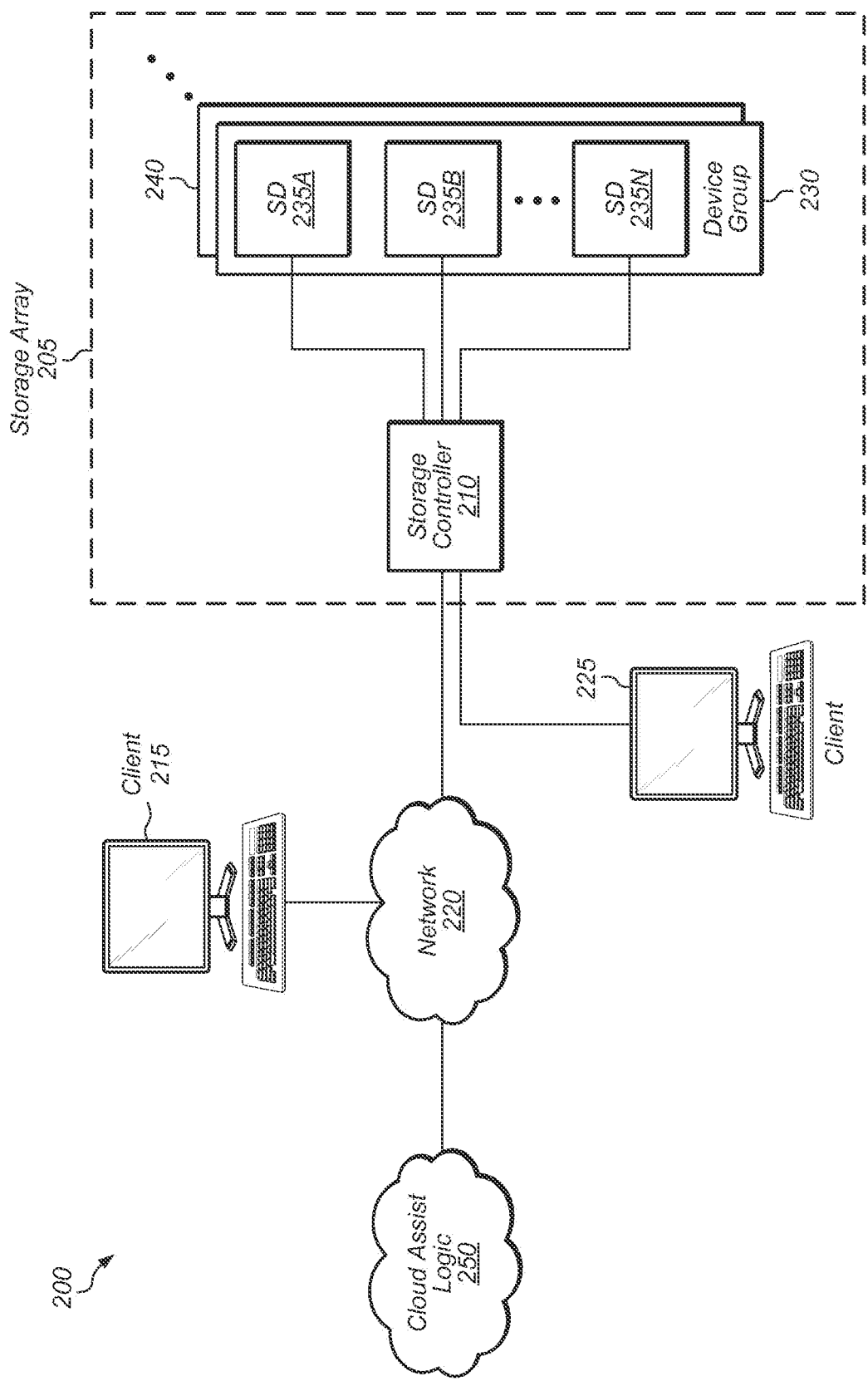
FIG. 2 is a generalized block diagram illustrating one embodiment of a storage system.

Turning now to FIG. 2, a generalized block diagram of one embodiment of a storage system 200 is shown. Storage system 200 may include storage array 205, clients 215 and 225, network 220, and cloud assist logic 250. Storage array 205 may include storage controller 210 and storage device groups 230 and 240, which are representative of any number of storage device groups. As shown, storage device group 230 includes storage devices 235A-N, which are representative of any number and type of storage devices (e.g., solid-state drives (SSDs)). It should be understood that while storage system 200 is shown as including one storage array, in other embodiments, storage system 200 may include a plurality of storage arrays. It is noted that storage array 205 may also be referred to as a storage subsystem or a storage system.

Storage array 205 may be configured to generate performance data and send the performance data to cloud assist logic 250. Cloud assist logic 250 may be configured to generate a read-only GUI from the received performance data to allow users to remotely login and view the status of storage array 205. The read-only GUI may have the same or a substantially similar view as the local GUI which storage array 205 generates for local users to manage storage array 205.

Storage controller 210 of storage array 205 may be coupled directly to client computer system 225, and storage controller 210 may be coupled remotely over network 220 to client computer system 215. Clients 215 and 225 are representative of any number of clients which may utilize storage system 200 for storing and accessing data. It is noted that some systems may include only a single client, connected directly or remotely to storage controller 210. It is also noted that storage array 205 may include more than one storage controller in some embodiments.

Storage controller 210 may include software and/or hardware configured to provide access to storage devices 235A-N. Although storage controller 210 is shown as being separate from storage device groups 230 and 240, in some embodiments, storage controller 210 may be located within one or each of storage device groups 230 and 240. Storage controller 210 may include or be coupled to a base operating system (OS), a volume manager, and additional control logic for implementing the various techniques disclosed herein.

Storage controller 210 may include and/or execute on any number of processors and may include and/or execute on a single host computing device or be spread across multiple host computing devices, depending on the embodiment. In some embodiments, storage controller 210 may generally include or execute on one or more file servers and/or block servers. Storage controller 210 may use any of various techniques for replicating data across devices 235A-N to prevent loss of data due to the failure of a device or the failure of storage locations within a device. Storage controller 210 may also utilize any of various deduplication and/or compression techniques for reducing the amount of data stored in devices 235A-N.

Network 220 may utilize a variety of techniques including wireless connection, direct local area network (LAN) connections, wide area network (WAN) connections such as the Internet, a router, storage area network, Ethernet, and others. Network 220 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 220. The network 220 may interface with a set of communications protocols used for the Internet such as the Transmission Control Protocol (TCP) and the Internet Protocol (IP), or TCP/IP.

Client computer systems 215 and 225 are representative of any number of stationary or mobile computers such as desktop personal computers (PCs), servers, server farms, workstations, laptops, handheld computers, servers, personal digital assistants (PDAs), smart phones, and so forth.

Generally speaking, client computer systems 215 and 225 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

It is noted that in alternative embodiments, the number and type of storage arrays, client computers, storage controllers, networks, storage device groups, and data storage devices is not limited to those shown in FIG. 2. At various times one or more clients may operate offline. In addition, during operation, individual client computer connection types may change as users connect, disconnect, and reconnect to system 200. Furthermore, the systems and methods described herein may be applied to directly attached storage systems or network attached storage systems and may include a host operating system configured to perform one or more aspects of the described methods. Numerous such alternatives are possible and are contemplated.

Figure 3:
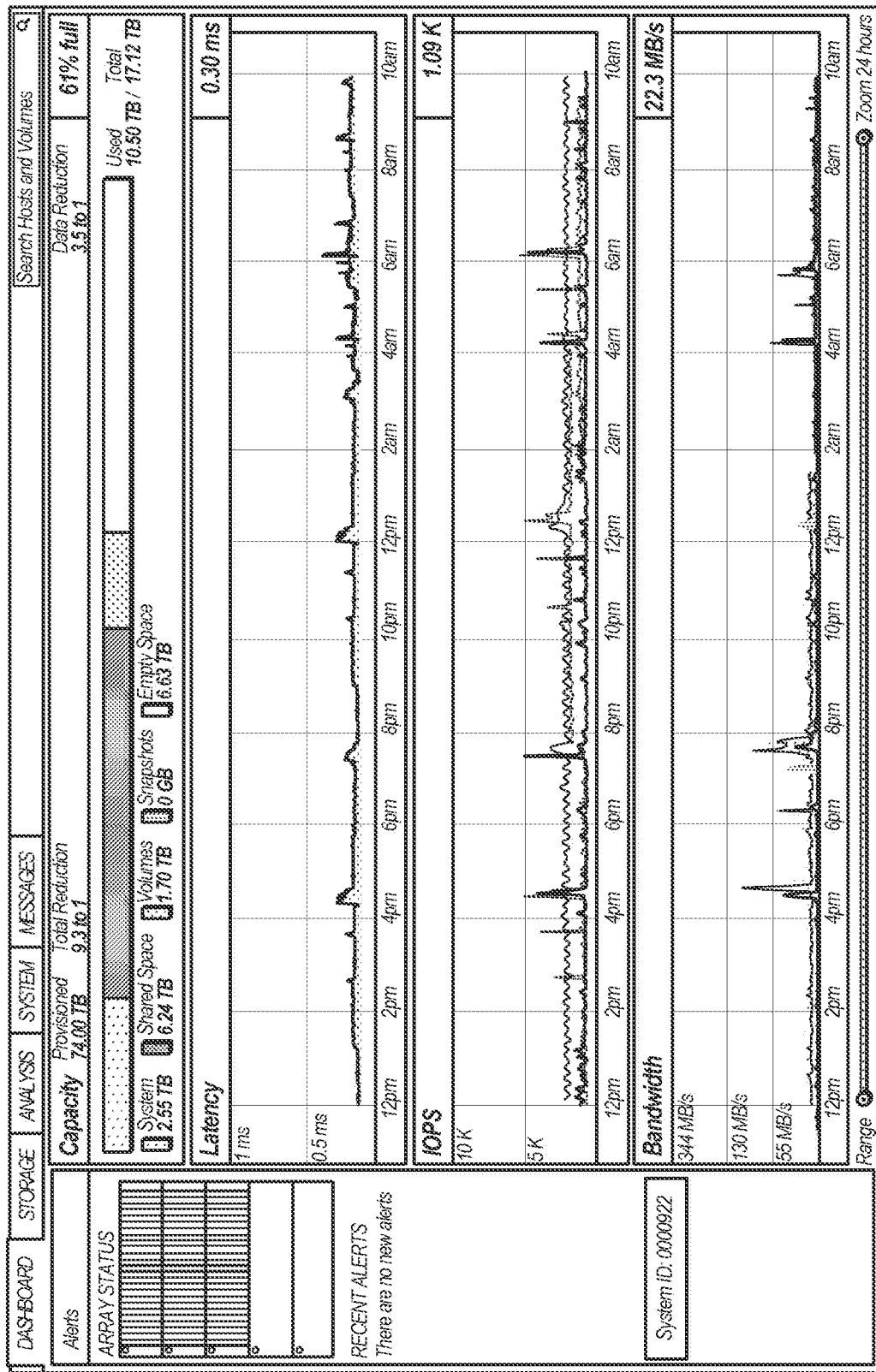
FIG. 3 illustrates one embodiment of a local GUI for managing a storage system.

Referring now to FIG. 3, one embodiment of a local GUI for managing a storage system is shown. The GUI may be generated locally by the storage system for directly connected users or for remote users to login to and view the GUI from outside the network of the storage system. The GUI may have multiple tabs as shown in FIG. 3. For example, the dashboard tab is selected in the view shown in FIG. 3. The user may also be able to select other tabs as well, including a storage tab, analysis tab, system tab, and messages tab. By selecting these tabs, the user may change the view of what is shown in the GUI.

On the left side of the dashboard, recent alerts may be listed. In the center of the dashboard, the capacity of the storage system may be listed, with the provisioned storage listed as 74.00 terabytes (TB). The total reduction of data due to compression and deduplication is also listed in the capacity view as 9.3 to 1. The total reduction of data may vary depending on the type of data being stored and the amount of compression and deduplication that can be achieved. Also, the data reduction is listed as 3.5 to 1 in the capacity section of the GUI. Additionally, the amount of storage space currently being utilized by the storage system is shown to the right of the data reduction value, with the current utilization listed as "61% full".

A horizontal graph showing the utilization of storage capacity may also be shown in the GUI. The capacity utilized for system data, shared space, volumes, snapshots, and empty space are shown in the GUI. In other embodiments, this information may be displayed using a bar graph, pie chart, a line graph, or any of various other types of charts.

The storage system GUI also displays timeline charts of latency, input/output operations per second (IOPS), and bandwidth. A tool at the bottom of the GUI allows the user to select the range of these timeline charts and to zoom in or out. In the top right of the GUI, the user may enter in the names of hosts or volumes to search for, with the GUI returning the corresponding results depending on the user's search query.

It should be understood that the local storage system GUI shown in FIG. 3 is merely one example of a local GUI which may be used to monitor the status and manage the operations of one or more storage systems. It is noted that in other embodiments, the local storage system GUI may display other information and/or exclude some of the information shown in FIG. 3. Additionally, in other embodiments, the local storage system GUI may be organized differently and may use other types of charts and graphs to display information to the user. For example, in another embodiment, a command line interface (CLI) may be utilized rather than a GUI, with the user issuing commands to the local storage system via the CLI. In a further embodiment, the local storage system may support both a CLI and a GUI.

Figure 4:
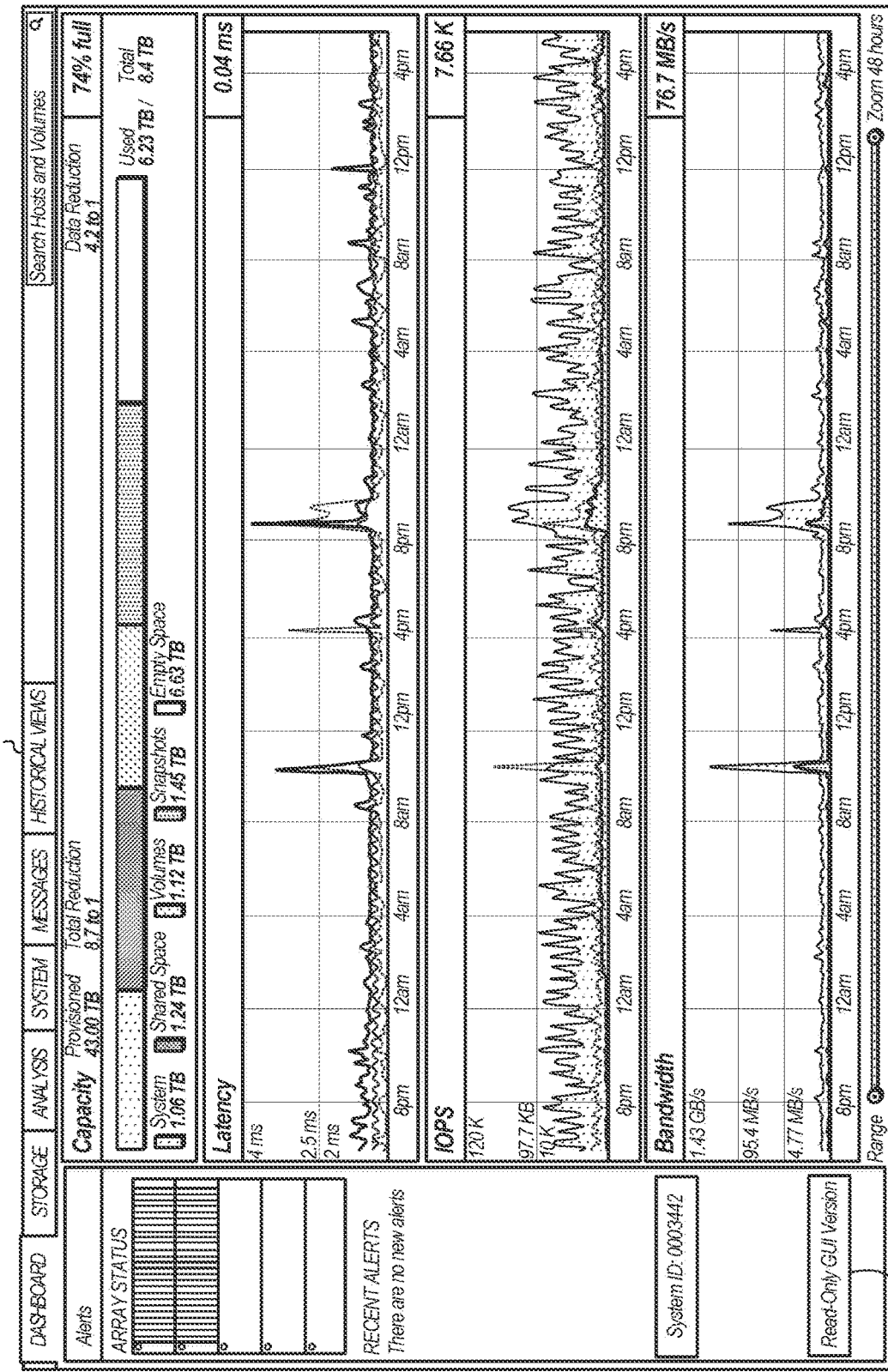
FIG. 4 illustrates one embodiment of a read-only GUI of the status of a storage system.

Turning now to FIG. 4, one embodiment of a read-only GUI is shown. The read-only GUI shown in FIG. 4 has an almost identical appearance as the local GUI shown in FIG. 3. However, one difference in the view of the GUI shown in FIG. 4 is the indication 405 which specifies that this is a read-only GUI version. This indication 405 is not an essential part of the read-only GUI and may be omitted in some embodiments. Another difference between the read-only version of the GUI and the local version of the GUI is tab 410 for selecting historical views of the storage system status. When selecting this tab 410, the user may specify a point in time at which they wish to view the status of the storage system.

The advantages of the read-only GUI are that a user may monitor the status of a storage system without impacting the security of the storage system. For example, if the user is on an insecure network, the user may login to the cloud assist service without compromising the security of the storage system. Similarly, if the user is on a device which the user does not trust, the user can still access the read-only GUI to view the status of the storage system.

In one embodiment, all the configuration and performance data which is used to generate the local GUI at the storage system may be recorded and conveyed to the cloud assist service. Then this stored data may be utilized by the cloud assist service to create the read-only GUI. This allows a user to view the status of the storage system without having to connect directly to the storage system. There may be a slight lag in time where the read-only GUI is showing the state of the storage system as of the most recently received log data.

The read-only GUI will appear to the user to be the same as the local GUI, albeit with some slight differences. The main difference is that the user will not be able to make any changes to the storage system. For example, actions that the user is accustomed to being able to perform on the local GUI, such as creating a new host or deleting a volume, will be unavailable via the read-only GUI. However, the status information and performance data will be available and presented in the same manner on the read-only GUI as is presented on the local GUI.

Figure 5:
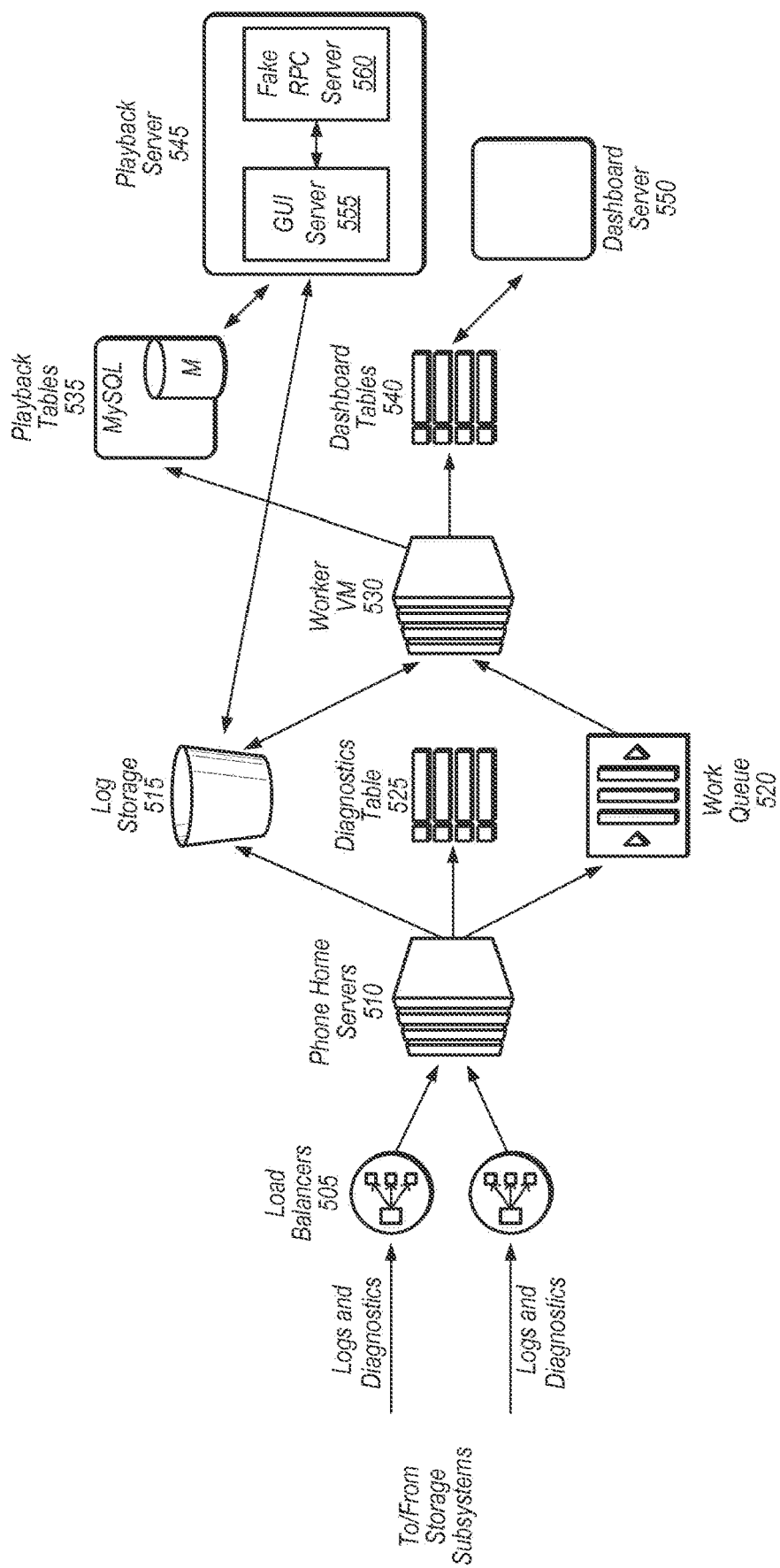
FIG. 5 is a generalized block diagram illustrating one embodiment of a cloud assist service processing storage subsystem logs.

Referring now to FIG. 5, a block diagram of one embodiment of a cloud assist service processing storage subsystem logs is shown. Logs generated by the storage subsystems (not shown) may traverse load balancers 505 and then may be conveyed to phone home servers 510. The logs may be saved and queued for background processing in log storage 515 and work queue 520. Every log in work queue 520 may trigger a playback processing task via worker virtual machines (VMs) 530. Additionally, diagnostics generated by the storage subsystems may be saved and queued for background processing in diagnostics table 525 and work queue 520. The worker VMs 530 may update the dashboard tables 540 during playback processing. The dashboard server 550 may pull the most recent data from dashboard tables 540.

The worker VMs 530 may retrieve Structured Query Language (SQL) logs from log storage 515 and apply the SQL logs to playback tables 535. Playback server 545 may be configured to load playback remote procedure calls (RPC) requests and query log storage 515 for the corresponding RPC responses. Playback server 545 may include GUI server 555 and fake RPC server 560. In one embodiment, GUI server 555 and fake RPC server 560 may be scripts or programs executing on the cloud assist service. It is noted that in other embodiments, other types of requests and responses, besides RPC requests and responses, may be utilized to query the state of the storage subsystems. For example, in another embodiment, representational state transfer (REST) requests and responses may be utilized rather than RPC requests and responses.

In one embodiment, a storage subsystem may be configured to record and phone home different types of log files. The first type of log file may be a full SQL database dump, which may be performed initially and then on a regularly scheduled basis. A second type of log file which may be utilized is an incremental SQL file, and these may be generated and conveyed to the cloud assist service on a more frequent basis than the full SQL database dump. These first two types of log files may include historical capacity and performance data. The storage subsystem may maintain multiple separate tables for performance data, capacity utilization, volume data, and other information, and when these tables are updated, corresponding log files may also be sent to the cloud assist service. These tables may be used to drive the historical graphs (for IOPS, bandwidth, latency, etc.) in the local GUI. The cloud assist service may also maintain corresponding tables for each storage subsystem, and the GUI server 555 may access these tables for generating the read-only GUI. A third type of log file which may be utilized is a listing of remote procedure call (RPC) requests and responses, which may be in a serialized python object (or pickle) format. In other embodiments, alternative types of formats may be utilized.

In one embodiment, each storage subsystem may execute a script which generates a plurality of RPC requests and records the corresponding responses generated by the storage subsystem. The script may use the same RPC requests that the local GUI makes in order to generate the different types of views and data shown in the local GUI. For each request made, a key may be stored and the response to the request may be recorded as the corresponding value. Once all of the RPC requests have been made and the responses recorded, the listing of key-value pairs may be sent to the cloud assist service. In one embodiment, the listing may identify volumes and hosts on the storage subsystem as well as additional information. These listings may be generated on a periodic basis (e.g., hourly, daily). In one embodiment, the listing may be stored as a serialized python object (or pickle) format file. In other embodiments, alternative types of formats may be utilized.

To perform GUI playback for a given storage subsystem, the SQL log files may be processed to update the tables corresponding to the given storage subsystem in playback tables 535. In some cases, preprocessing may be performed so that the logs may be processed more efficiently. In one embodiment, there may be one database created per storage subsystem. GUI server 555 may access the database to generate the historical capacity and performance data for the read-only GUI generated during GUI playback. GUI server 555 may also generate RPC requests for conveyance to the actual storage subsystem. However, instead of sending the RPC requests to the storage subsystem, the RPC requests may be redirected to fake RPC server 560. Fake RPC server 560 may be configured to accept requests from GUI server

555 and to lookup responses from the most recently recorded RPC request-response listing for the given storage subsystem. The fake RPC server 560 may also be referred to as a "subsystem simulator". When GUIs are run in playback mode, an extra RPC argument with the storage subsystem identifier (ID) may be sent to the fake RPC server 560. The fake RPC server 560 may find the appropriate listing using the storage subsystem ID and may look up responses using the storage subsystem ID and a key, which may be the sorted request in JavaScript Object Notation (JSON).

The fake RPC server 560 may communicate with the GUI server 555 as if the fake RPC server 560 were the selected storage subsystem. In other words, when GUI server 555 receives a response from fake RPC server 560, GUI server 555 treats the response as if it came from the selected storage subsystem. Accordingly, the fake RPC server 560 responds as if it were the selected storage subsystem when receiving requests from the GUI server 555. When the fake RPC server 560 receives a RPC request from the GUI server 555, the fake RPC server 560 may look up the RPC request-response listing for the selected storage subsystem, find the key that corresponds to the received request, and return the value from the key-value pair in the listing. The GUI server 555 receives the response as if it came from the actual storage subsystem and then the GUI server 555 continues with additional requests or processes the responses to generate the read-only GUI.

For example, in one embodiment, a sample GUI RPC request may be the following: 'volume.list({"user":"api"}, "123-456-7890")'. The fake RPC server 560 may look up the latest pickle file for the storage subsystem ID: "123-456-7890". The fake RPC server 560 may load the pickle file and cache it. Then, the fake RPC server 560 may remove the "user" key from the request JSON and lookup and return the response for 'volumelist({ })'. Another example of a RPC request is the following: 'volumelist({"pending":False. "space":True, "total":False})'. In playback mode, the GUI server 555 may be configured to keep track of one subsystem ID per session and use the ID to connect to the appropriate database in playback tables 535. The GUI server 555 may be configured to pass the subsystem ID when executing RPC requests. The GUI server 555 may also be configured to turn off all in-memory caching of state and run mostly stateless, disable editing controls, pretend that the current time is the last recorded time of the subsystem being viewed, and turn off polling for page refreshes.

In one embodiment, multiple GUI servers may be hosted by the cloud assist service, with each GUI server handling a range of storage subsystem GUI versions. Versions of every supported GUI server may be automatically downloaded and installed on instances with the playback role. When clicking on a GUI link, the launch script may pick the appropriate server to redirect to. In this way, the simulated playback GUI generated by the cloud assist service will match the local GUI generated by the storage subsystem.

For example, if a first storage array has version 3 of the GUI, and a second storage array has version 4 of the GUI, then the GUI server utilized in the cloud assist service for the first storage array will be version 3, and the GUI server utilized for the second storage array will be version 4. This prevents errors or other unintended consequences if mismatched GUI versions are paired up between the storage array and the cloud assist service. For example, version 4 of the GUI may show information that is not available (e.g., replication events) in version 3 of the GUI, and this information may be obtained from RPC responses to new RPC requests that were not included in version 3. If the first storage array uses a version 3 based script to generate the RPC request-response listing, this script will not generate the new RPC requests and will not have the corresponding responses. This listing will be stored with the cloud assist service, and if the cloud assist service were to use version 4 of the simulated playback GUI for the first storage array, then the simulated playback GUI would not be able to display the information about the replication events since this information was not captured by the script executing on the first storage array.

Figure 6:
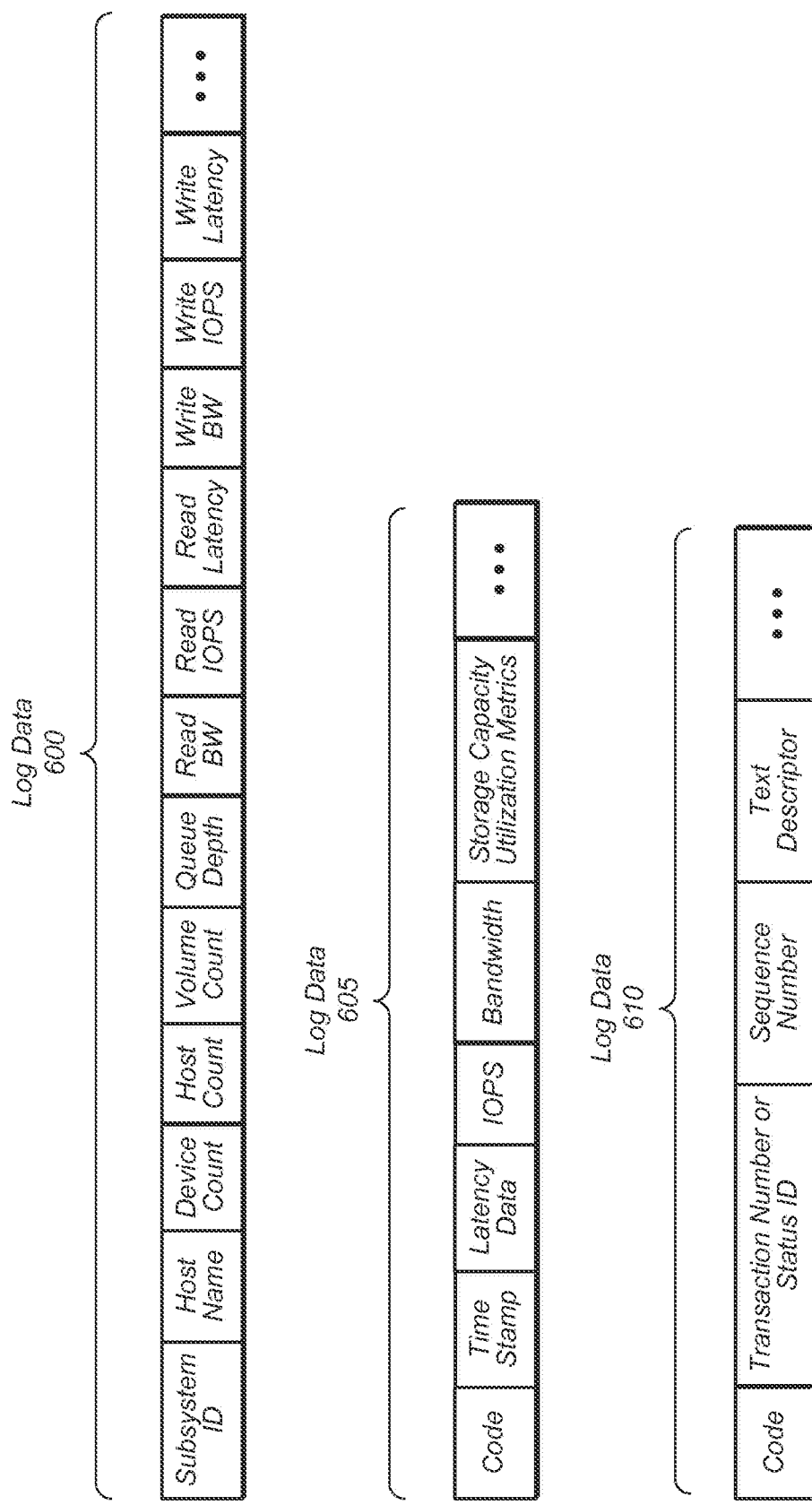
FIG. 6 illustrates three examples of log data generated by a storage system.

Turning now to FIG. 6, three examples of log data generated by a storage system are shown. Log data 600 is one example of log data which may be generated by a storage system and conveyed to cloud assist logic. Log data 600 may be captured over a programmable period of time and then sent to the cloud assist logic. Log data 600 may include values and metrics that can be utilized by the cloud assist logic to generate a status view in a GUI similar to the read-only GUI shown in FIG. 4.

In one embodiment, log data 600 may include fields including a subsystem ID, host name, storage device count, host count, volume count, queue depth, read bandwidth (BW), read IOPS, read latency, write BW, write IOPS, write latency, and one or more other fields. In other embodiments, log data 600 may include other information and/or may be structured differently.

Log data 605 is another example of log data which may be generated by a storage system and conveyed to cloud assist logic. In one embodiment, log data 605 may be automatically generated on a scheduled basis and sent to the cloud assist logic. In other embodiments, log data 605 may be manually generated by a user or the user may determine when log data 605 is generated and conveyed to the cloud assist logic.

Log data 605 may include a code to identify which type of data it represents and a time stamp to identify when the data was generated. Log data 605 may also include latency data, IOPS, and bandwidth values that were captured during the most recent time period. Log data 605 may also include storage capacity utilization metrics, such as the amount of storage space utilized by system, shared space, volumes, and snapshots. In other embodiments, other storage capacity utilization metrics in addition to the above may be utilized. Log data 605 may also include one or more additional data fields.

Log data 610 is another type of log data which may be sent from a storage system to the cloud assist logic. In one embodiment, the storage system may alternate between sending log data 600, 605, and 610 to the cloud assist logic, with the code field or subsystem ID indicating which type of packet is being sent. Other types of log data not shown in FIG. 6 may also be sent, with these other types of log data being indicated by different codes.

Log data 610 includes a code field followed by a transaction number of status ID field. Next, log data 610 may include a sequence number to indicate the most recently used sequence number. Alternatively, the sequence number field may specify a range of sequence numbers that were used over a recent period of time. Next, log data 610 may include a text descriptor field. The text descriptor field may be automatically generated text or this field may include comments inserted manually by an administrator or other user. Log data 610 may also include one or more additional data fields.

The size of log data 605 and 610 may vary depending on the embodiment. In one embodiment, the log data may have a fixed size. In another embodiment, the log data may have a variable size, with the size of the data indicated in one of the data fields. In other embodiments, the log data may have a variable size which is not specified within any of the data fields. It is noted that in other embodiments, other types of log data may be captured and sent from one or more storage systems to the cloud assist logic.

Figure 7:
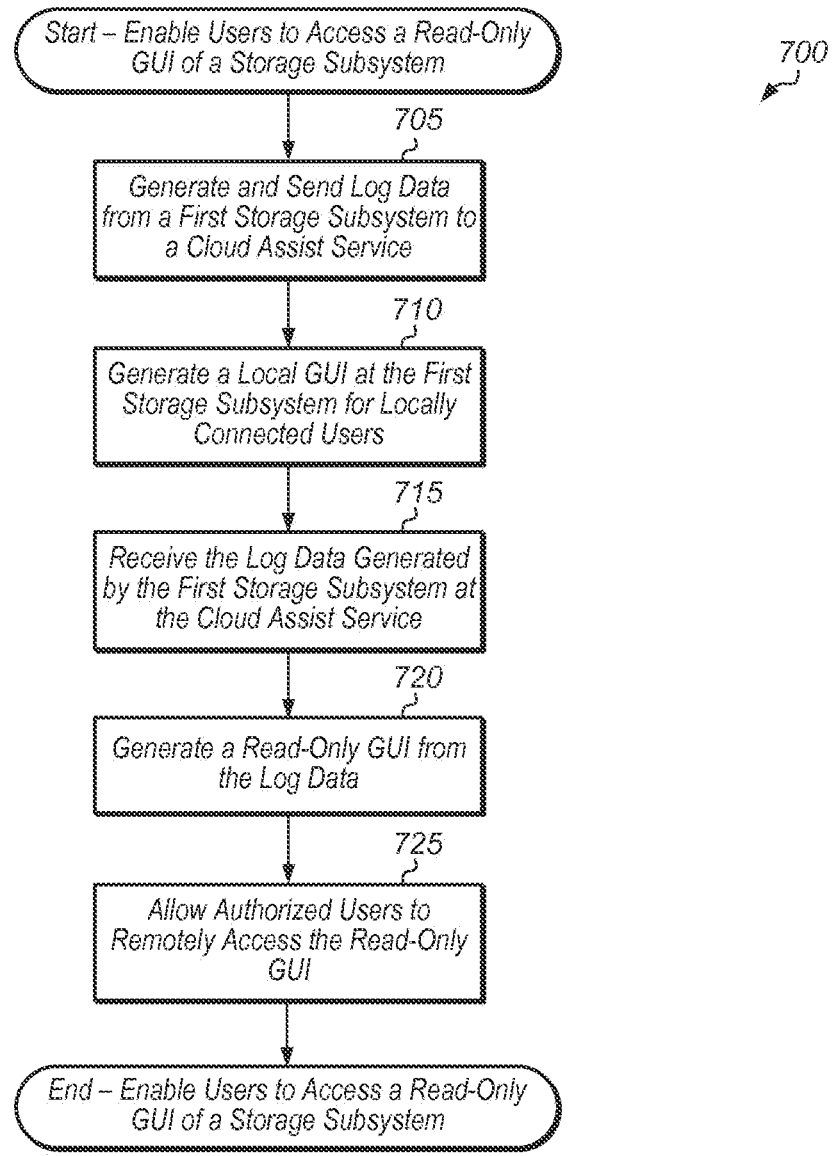
FIG. 7 is a generalized flow diagram illustrating one embodiment of a method for enabling users to access a read-only GUI of a storage subsystem.

Referring now to FIG. 7, one embodiment of a method 700 for enabling users to access a read-only GUI of a storage subsystem is shown. Any of the cloud assist services or cloud assist logic units described herein in combination with a storage controller (e.g., storage controller 210 of FIG. 2) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

A first storage subsystem may generate and send log data to a cloud assist service (block 705). The log data may include diagnostics and performance data associated with various operating conditions of the first storage subsystem. In one embodiment, the first storage subsystem may be a storage array. In some embodiments, the first storage subsystem may be coupled to one or more other storage subsystems, and the first storage subsystem may convey log data from a plurality of storage subsystems to the cloud assist service. The cloud assist service may be configured to perform any combination of various functions for the first storage subsystem, such as storage and analysis of log data, generation of alerts, replication of data, generation of read-only GUIs, as well as other functions.

The first storage subsystem may also generate a local GUI for a locally connected user (block 710). In one embodiment, a GUI library may make RPC calls to the first storage subsystem to generate the GUI. The GUI may have a familiar interface to the user, with tabs and clickable buttons, and graphs, bars, charts indicating the current performance and status of the first storage subsystem. However, this local GUI may only be available to users directly connected to the first storage subsystem or to remote users who login to the network of the first storage subsystem.

The cloud assist service may receive the log data generated by the first storage subsystem (block 715). Then, the cloud assist service may generate a read-only GUI from the log data (block 720). The cloud assist service may generate the read-only GUI to utilize a substantially similar appearance to the local GUI so that a user will be familiar with the look and feel of the read-only GUI. The cloud assist service may allow authorized users to remotely access the read-only GUI (block 725). After block 725, method 700 may end.

Users may be able to login and view the read-only GUI to monitor the status of the first storage subsystem. A user will be able to switch views within the GUI by selecting different tabs and access menu items the same way as the user is accustomed to using as if the user were connected to the local GUI, with the exception that the user will be unable to make changes to the first storage subsystem. For example, in one embodiment, some of the actions the user may be accustomed to seeing and clicking on may be grayed out to indicate these actions cannot be performed using the read-only GUI. Also, there may be other minor differences between the local GUI and the read-only GUI.

Figure 8:
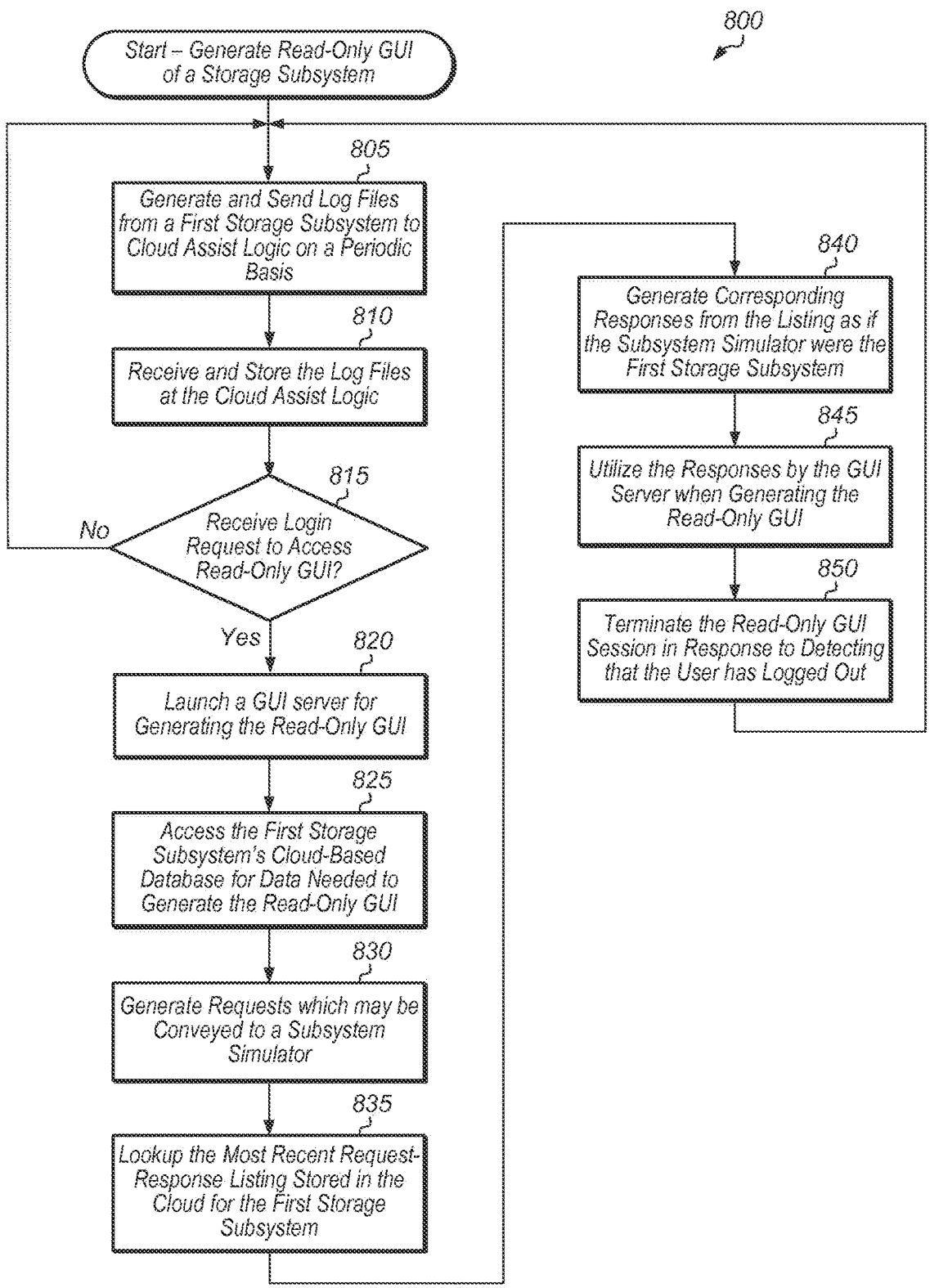
FIG. 8 is a generalized flow diagram illustrating one embodiment of a method for generating a read-only GUI of a storage subsystem.

Turning now to FIG. 8, one embodiment of a method 800 for generating a read-only GUI of a storage subsystem is shown. Any of the cloud assist logic units described herein in combination with a storage controller (e.g., storage controller 210 of FIG. 2) may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment.

A first storage subsystem may generate and send log files to the cloud assist logic on a periodic basis (block 805). The log files may include database files and request-response listings. In one embodiment, the database files may include historical capacity and performance data while the request-response listings may include information regarding the objects utilized by the first storage subsystem. The cloud assist logic may receive and store the log files generated by the first storage subsystem (block 810). In one embodiment, the cloud assist logic may maintain a database corresponding to the first storage subsystem, and the cloud assist logic may update the first storage subsystem's database using the received database files.

Next, the cloud assist logic may determine if it has received a request from an authorized user to login and access the read-only GUI of the first storage subsystem (conditional block 815). If no authorized users have requested access to the read-only GUI of the first storage subsystem (conditional block 815, "no" leg), then method 800 may return to block 805 with the first storage subsystem generating additional log files.

If an authorized user has requested access to the read-only GUI of the first storage subsystem (conditional block 815, "yes" leg), then the cloud assist logic may launch a GUI server for generating the read-only GUI (block 820). The GUI server may access the first storage subsystem's cloud-based database for the data (e.g., historical capacity, performance data) needed to generate the read-only GUI (block 825). The GUI server may also generate requests which may be conveyed to a subsystem simulator (block 830). In one embodiment, the requests may be RPC requests and the subsystem simulator may be a fake RPC server. The GUI server may generate requests with the intention of sending the requests to the first storage subsystem. However, a redirection layer may instead route the requests to the subsystem simulator.

Next, the subsystem simulator may look up the most recent request-response listing stored in the cloud for the first storage subsystem (block 835). Then, the subsystem simulator may generate corresponding responses from the listing as if the subsystem simulator were the first storage subsystem (block 840). Then, the GUI server may utilize the responses when generating the read-only GUI (block 845). At a later point in time, the cloud assist logic may terminate the read-only GUI session in response to detecting that the user has logged out (block 850). After block 850, method 800 may return to block 805 with the first storage subsystem generating additional logs.

Figure 9:
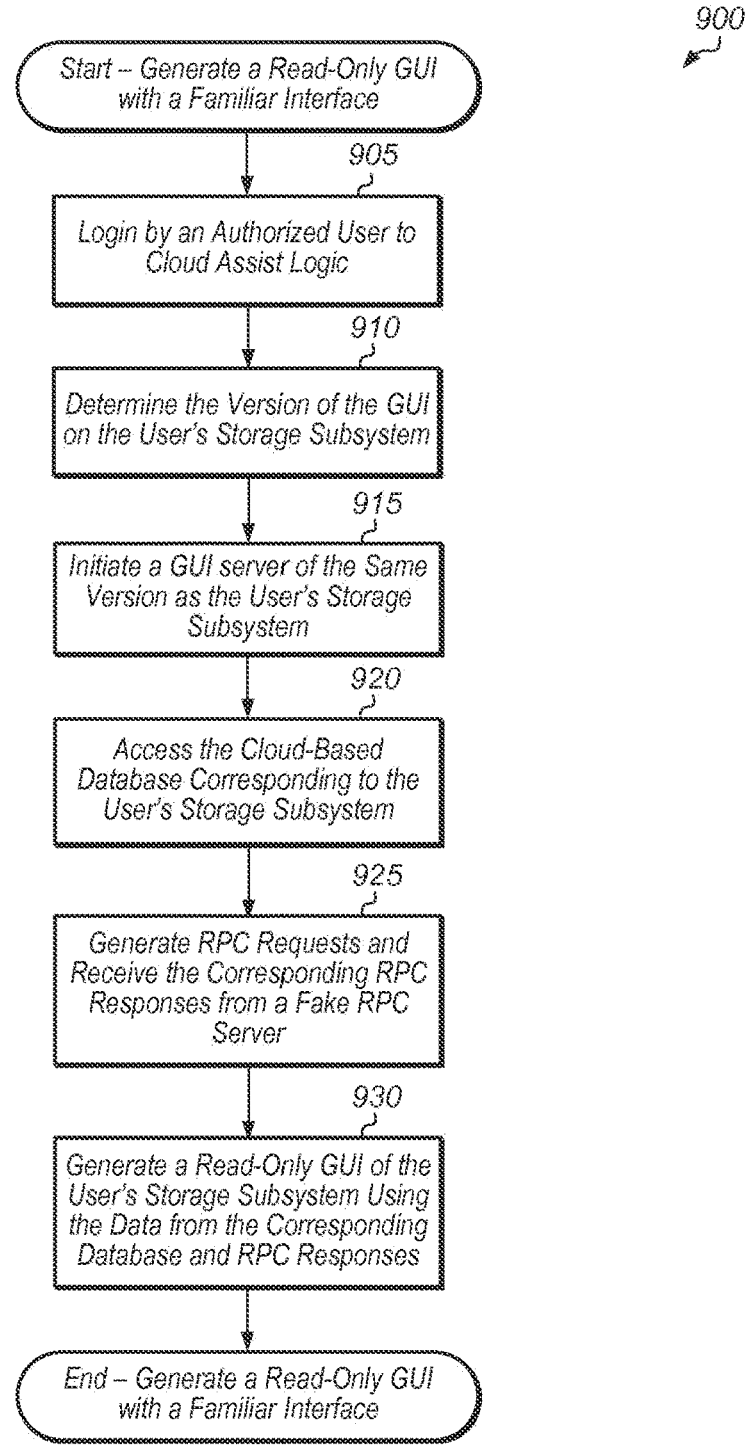
FIG. 9 is a generalized flow diagram illustrating one embodiment of a method for generating a read-only GUI of a storage subsystem with a familiar interface.

Referring now to FIG. 9, one embodiment of a method 900 for generating a read-only GUI of a storage subsystem with a familiar interface is shown. Any of the cloud assist logic units described herein in combination with a storage controller (e.g., storage controller 210 of FIG. 2) may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment.

An authorized user may remotely login to cloud assist logic (block 905). In response to the user logging in, the cloud assist logic may determine the version of the GUI which resides on the storage subsystem with which the user is associated (block 910). Different storage subsystems may have different versions of the GUI as the GUI evolves over time, and the user may be accustomed to using the specific version of the GUI they see when they are able to login to their storage subsystem.

After determining the version of the GUI which is running on the storage subsystem associated with the user, the cloud assist logic may initiate a GUI server of the same version as the user's storage subsystem (block 915). The GUI server may access the cloud-based database corresponding to the user's storage subsystem (block 920). Also, the GUI server may generate RPC requests and then receive the corresponding RPC responses from a fake RPC server (block 925). Then, the GUI server may generate a read-only GUI of the user's storage subsystem using the data from the corresponding database and RPC responses (block 930). After block 930, method 900 may end.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system comprising:
a cloud-based system that includes a non-transitory computer readable medium and a computer processor, wherein the non-transitory computer readable medium includes computer program instructions that when executed by the computer processor cause the cloud-based system to carry out the steps of:
receiving a request for remote access to a storage system of one or more storage systems;
identifying, for a user profile, a locally utilized version of a user interface ('UI') that is utilized when locally accessing the storage system; and
generating, using historical status information associated with the one or more storage systems, responses to requests directed to the storage system as if the cloud-based system was the storage system; and
presenting, for the storage system, a remote UI that matches the locally utilized version of the UI, wherein the remote UI provides read-only access to the storage system and presents a view of a historical state of the storage system using the generated responses.

2. The system of claim 1 wherein the one or more storage systems are configured to generate a local GUI presenting a view of the status of the one or more storage systems, and wherein an appearance of the remote UI is substantially similar to an appearance of the local GUI.

3. The system of claim 2 wherein the non-transitory computer readable medium further includes computer program instructions that when executed by the computer processor cause the cloud-based system to carry out the step of generating, by the cloud-based system, the remote UI to match the local GUI.

4. The system of claim 1 wherein a user is unable to make changes to the one or more storage systems using the remote UI.

5. The system of claim 1 wherein the historical status information includes at least one of volume count, queue depth, read bandwidth, read input/output operations per second (IOPS), read latency, write bandwidth, write IOPS, and write latency.

6. The system of claim 1 wherein the cloud-based system is further configured to generate the remote UI when the one or more storage systems is offline.

7. A method comprising:
receiving a request for remote access to a storage system of one or more storage systems;
identifying, by a cloud-based system for a user profile, a locally utilized version of a user interface ('UI') that is utilized when locally accessing the storage system; and
generating, using historical status information associated with the one or more storage systems, responses to requests directed to the storage system as if the cloud-based system was the storage system; and
presenting, for the storage system, a remote UI that matches the locally utilized version of the UI, wherein the remote UI provides read-only access to the storage system and presents a view of a historical state of the storage system using the generated responses.

8. The method of claim 7 wherein the one or more storage systems are configured to generate a local GUI presenting a view of the status of the one or more storage systems, and wherein an appearance of the remote UI is substantially similar to an appearance of the local GUI.

9. The method of claim 8 further comprising generating, by the cloud-based system, the remote UI to match the local GUI.

10. The method of claim 7 wherein a user is unable to make changes to the one or more storage systems using the remote UI.

11. The method of claim 7 wherein the historical status information includes at least one of volume count, queue depth, read bandwidth, read input/output operations per second (IOPS), read latency, write bandwidth, write IOPS, and write latency.

12. The method of claim 7 wherein the cloud-based system is further configured to generate the remote UI when the one or more storage systems is offline.

13. A non-transitory computer readable storage medium storing program instructions, wherein the program instructions are executable by a processor of a cloud-based storage system to carry out the steps of:

receiving a request for remote access to a storage system of one or more storage systems;

identifying, for a user profile, a locally utilized version of a user interface ('UI') that is utilized when locally accessing the storage system; and generating, using historical status information associated with the one or more storage systems, responses to requests directed to the storage system as if the cloud-based system was the storage system; and presenting, for the storage system, a remote UI that matches the locally utilized version of the UI, wherein the remote UI provides read-only access to the storage system and presents a view of a historical state of the storage system using the generated responses.

14. The non-transitory computer readable storage medium of claim 13 wherein the one or more storage systems are configured to generate a local GUI presenting a view of the status of the one or more storage systems, and wherein an appearance of the remote UI is substantially similar to an appearance of the local GUI.

15. The non-transitory computer readable storage medium of claim 14 further comprising program instructions to carry out the step of generating, by the cloud-based system, the remote UI to match the local GUI.

16. The non-transitory computer readable storage medium of claim 13 wherein a user is unable to make changes to the one or more storage systems using the remote UI.

17. The non-transitory computer readable storage medium of claim 13 wherein the historical status information includes at least one of volume count, queue depth, read bandwidth, read input/output operations per second (IOPS), read latency, write bandwidth, write IOPS, and write latency.

\* \* \* \* \*